(12) United States Patent
Henry

(10) Patent No.: US 8,176,217 B2
(45) Date of Patent: May 8, 2012

(54) SYSTEM AND METHOD FOR IMPLEMENTING A STORAGE PROTOCOL WITH INITIATOR CONTROLLED DATA TRANSFER

(75) Inventor: Russell J. Henry, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 931 days.

(21) Appl. No.: 11/312,080

(22) Filed: Dec. 20, 2005

(65) Prior Publication Data

US 2007/0162636 A1 Jul. 12, 2007

(51) Int. Cl.
G06F 13/00 (2006.01)
(52) U.S. Cl. .......................... 710/20; 710/33
(58) Field of Classification Search .................... 710/20, 710/33, 58, 61
See application file for complete search history.

(56) References Cited

U.S. PATENT DOCUMENTS

| 6,356,944 | B1 * | 3/2002 | McCarty | 709/222 |
| 6,683,883 | B1 * | 1/2004 | Czeiger et al. | 370/401 |
| 7,133,363 | B2 * | 11/2006 | Takase et al. | 370/230 |
| 7,362,702 | B2 * | 4/2008 | Terrell et al. | 370/230 |
| 2003/0185154 | A1 * | 10/2003 | Mullendore et al. | 370/230 |
| 2003/0189930 | A1 * | 10/2003 | Terrell et al. | 370/389 |
| 2005/0021889 | A1 * | 1/2005 | Arroyo et al. | 710/52 |
| 2005/0117522 | A1 * | 6/2005 | Basavaiah et al. | 370/252 |
| 2006/0080416 | A1 * | 4/2006 | Gandhi | 709/220 |
| 2006/0230218 | A1 * | 10/2006 | Warren et al. | 710/315 |
| 2008/0276017 | A1 * | 11/2008 | Benhase et al. | 710/36 |
| 2008/0320134 | A1 * | 12/2008 | Edsall et al. | 709/224 |
| 2009/0055585 | A1 * | 2/2009 | Fernandes et al. | 711/114 |

* cited by examiner

Primary Examiner — Chun-Kuan Lee
Assistant Examiner — Ernest Unelus
(74) Attorney, Agent, or Firm — Suiter Swantz pc llo

(57) ABSTRACT

The present invention is a system for implementing a storage protocol with initiator controlled data transfer including a host device, a target device and an intermediate device, the intermediate device for communicatively coupling the host device and the target device. The intermediate device is configured to control a data transfer phase of an input/output (I/O) between said intermediate device and said target device.

9 Claims, 3 Drawing Sheets

SYSTEM AND METHOD FOR IMPLEMENTING A STORAGE PROTOCOL WITH INITIATOR CONTROLLED DATA TRANSFER

FIELD OF THE INVENTION

The present invention relates to the field of electronic data storage and particularly to a system and method for implementing a storage protocol with initiator controlled data transfer.

BACKGROUND OF THE INVENTION

Block data transfer protocols for storage typically utilize some form of the SCSI (Small Computer System Interface) protocol. For example, a number of presently-implemented fabric storage, clustering, or grid storage systems utilize an intermediate device. In these systems, the intermediate device typically accepts a storage request (input/output (I/O) request) from a host/server and generates separate storage (I/O) requests to a plurality of associated target devices. If the protocols used within these I/O requests are SCSI-based protocols, each target device will control the data transfer phase to the intermediate device of the respective I/O request which it receives. For instance, if the I/O requests are read requests, the target devices will control the transfer of data from the target devices to the intermediate device. Typically, the intermediate device, upon receiving the requested data from the targets will buffer the data and transmit the buffered data to the host/server, thus requiring the intermediate device to maintain large amounts of memory. This buffering of data is sometimes referred to as "Store and Forward". However, systems implementing current SCSI protocol, as described above, often suffer from buffering inefficiency and therefore, decreased performance. Further, such systems often fail to fully utilize the bandwidth potential of the connection medium which connects the devices of the system.

Therefore, it may be desirable to have a system and method for implementing a storage protocol which addresses the above-referenced problems and limitations of the current solutions.

SUMMARY OF THE INVENTION

Accordingly, an embodiment of the present invention is directed to a system for implementing a storage protocol with initiator controlled data transfer including a host device, a target device and an intermediate device, the intermediate device for communicatively coupling the host device and the target device. The intermediate device is configured to control a data transfer phase of an input/output (I/O) between said intermediate device and said target device.

A further embodiment of the present invention is directed to a method for transmitting data between a host device and a target device, wherein the host device and the target device are communicatively coupled through an intermediate device via a connection medium. The method includes transmitting an initial input/output request from the host device to the intermediate device; generating a second input/output request based on the initial input/output request; transmitting the second input/output request from the intermediate device to the target device; transmitting a signal from the target device to the intermediate device indicating that the target device is ready for data transfer; and, streaming data between the host device and the target device for granting the input/output request.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
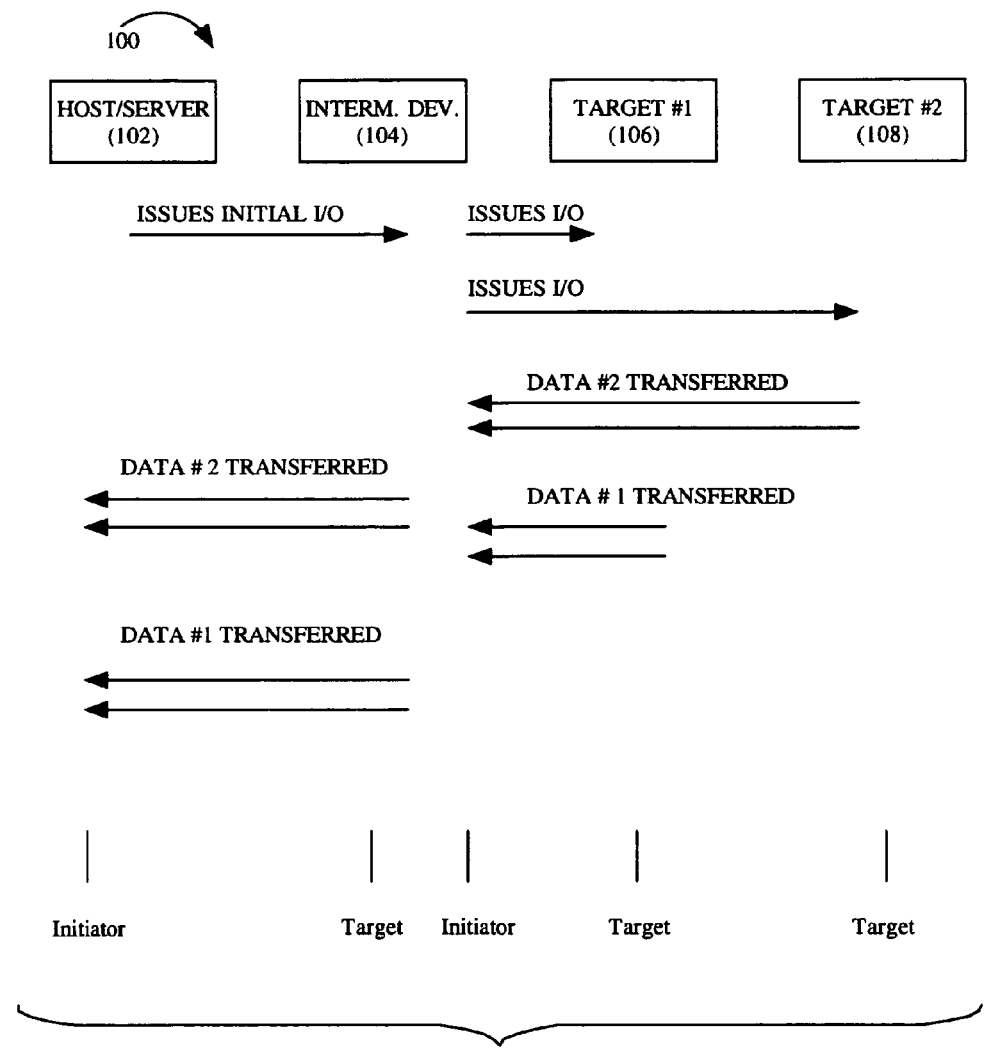
FIG. 1 is an illustration of a typical prior art system implementing SCSI protocol in which the target controls the data transfer phase of an input/output (I/O)

FIG. 1 illustrates a typical prior art storage system configuration 100. Included in the illustrated configuration are a host/server device 102, an intermediate device 104, a first target device 106, and a second target device 108. The intermediate device 104 communicatively couples the host/server device 102 with the first and second target devices (106, 108) via a connection medium (not shown). In the illustrated embodiment, the host device 102 issues an initial input/output (I/O) request to the intermediate device 104. In the illustrated embodiment, the initial input/output request is a read request in which the host requests to read specified data blocks. The intermediate device 104 accepts the initial input/output request and generates separate input/output requests to the target devices which contain the requested data. For instance, the first target device 106, may contain some of the requested data, while the second target device contains the remainder of the requested data. Therefore, the intermediate device may transmit a first read request to the first target device 106, and a second read request to the second target device 108. In the illustrated embodiment, the protocols used within the input/output requests are SCSI-based protocols. As is typical with current storage system configurations implementing such protocols (as shown in FIG. 1), the target device(s) (106, 108) control data transfer. For example, after accepting the first and second read requests respectively, the first and second target devices (106, 108) will each transfer requested data to the intermediate device 104. The transfer of requested data from the target device to the intermediate device is typically known as the data transfer phase of an input/output. The target devices (106, 108) control the data transfer phase in the sense that the intermediate device 104 receives no prior indication as to when the data will be transferred from the target devices.

Consequently, the intermediate device is required to buffer the data prior to transmitting it to the host device 102. Further, as shown in FIG. 1, the data transfer phases may overlap, meaning that the first target device 106 and the second target device 108 may send requested data to the intermediate device at the same time. If overlap of the data transfer phases occurs, the intermediate device 104 may be unable to efficiently utilize buffers in order to maximize system performance. Also, a key factor in maximizing system performance is to utilize the full bandwidth potential of the connection medium (typically in the 1 gigabyte per second range), something which typical buffer-implementing systems may be unable to achieve.

Figure 2:
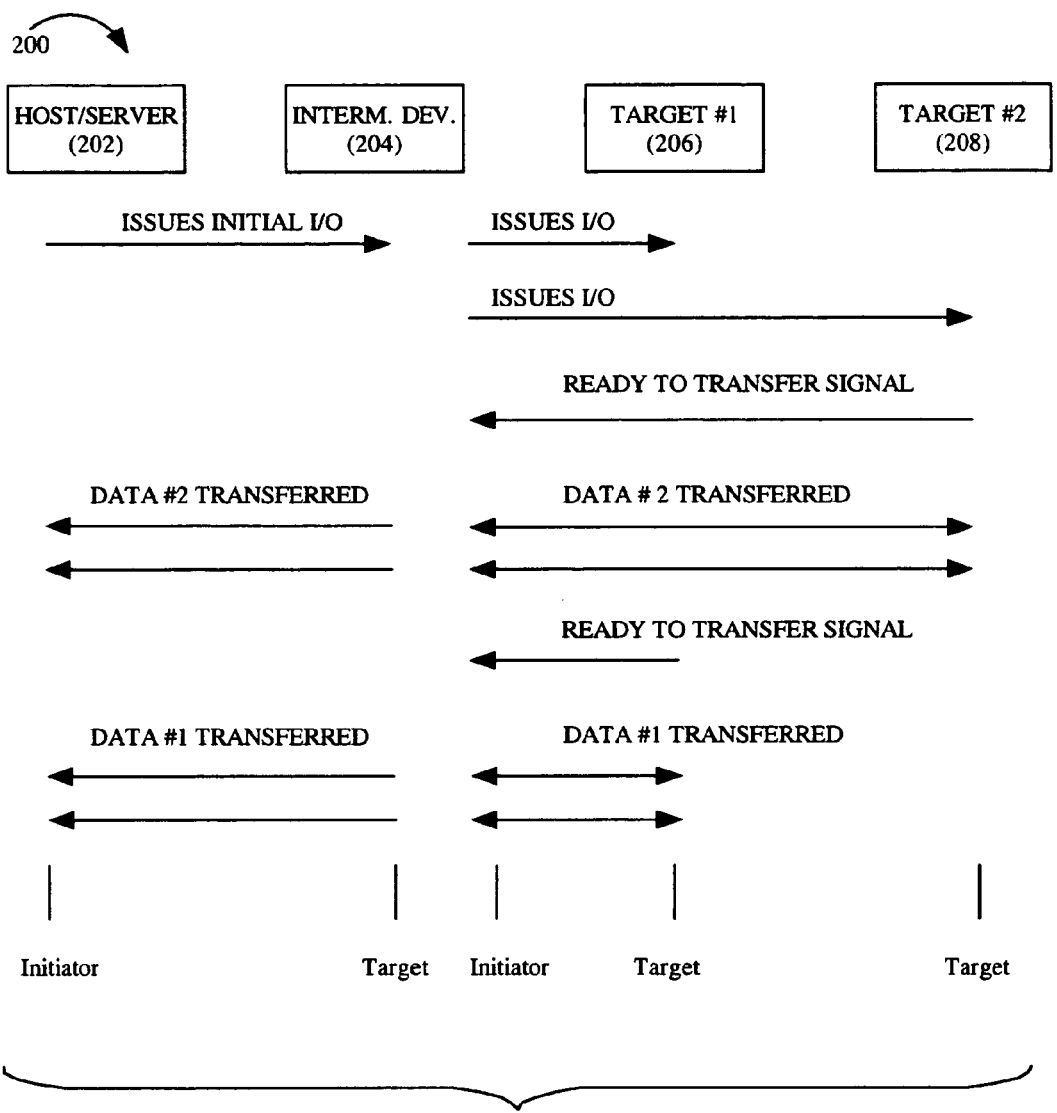
FIG. 2 is an illustration of a system implementing SCSI protocol in which an initiator (ex.—intermediate device) controls the data transfer phase of an input/output (I/O) in accordance with an exemplary embodiment of the present invention.

FIG. 2 illustrates a system implementing SCSI protocol in which an initiator controls the data transfer phase of an input/output (I/O) in accordance with an exemplary embodiment of the present invention. In a present embodiment, the system 200 includes a host device 202. For example, the host device 202 may be a host/server. The system further includes an intermediate device 204 and at least one target device. In the illustrated embodiment, the system includes a first target device 206 and a second target device 208. The intermediate device 204 communicatively couples the host device 202 with the first and second target devices (206, 208). In the exemplary embodiment, the host device 202 is configured for transmitting an initial input/output request. Further, the intermediate device 204 is configured to receive the initial input/output request from the host device and to generate one or more input/output requests based on the initial input/output request. For example, in the embodiment illustrated in FIG. 2, the initial input/output request is a read request asking to read certain data blocks, some of which are stored by the first target device 206, the remainder of which are stored by the second target device 208. After receiving such a request, the intermediate device 204 shown in FIG. 2 generates and transmits both a read request to the first target device 206 and a read request to the second target device 208 for obtaining said data blocks.

The intermediate device 204 is further configured to receive a signal transmitted from the target device (206 and/or 208) indicating that the target device is ready for data transfer. For instance, in the illustrated embodiment, after receiving the generated read requests, the first and second target devices (206, 208) each send respective signals to the intermediate device 204 providing an indication to the intermediate device that the data is ready to be read. This is in contrast to conventional systems as shown in FIG. 1, in which the intermediate device 104 receives no prior indication as to when data will be transferred from the target devices 106, 108. Thus, in the system 100 shown in FIG. 1, the targets control when data will be sent to the intermediate device (i.e., the data transfer phase), and only notify the intermediate device when data transfer has completed. Contrastingly, in the present invention, as shown in FIG. 2, the target devices (206, 208) allow the intermediate (i.e., initiator) device 204 to control the data transfer phase and more efficiently control local buffering resources by providing the aforementioned signals, which indicate that the data is ready to be transferred.

The intermediate device 204 is further configured for establishing a data transfer connection with the host device 202. For instance, in the illustrated embodiment, because the intermediate device 204 receives the aforementioned signals, it is able to prepare for the data transfer phase by establishing the necessary data transfer connections with the host device 202, and does not suffer from the buffering inefficiencies which may be encountered by current systems (like that shown in FIG. 1). For example, the intermediate device 204 may establish a first data transfer connection with the host 202 for transferring data between the first target device 206 and the host 202 and may further establish a second data transfer connection with the host 202 for transferring data between the second target device 208 and the host 202.

In the present embodiment, the intermediate device 204 is further configured to transmit data between the host device 202 and the target device (206 and/or 208) for granting the initial input/output request. For example, the intermediate device may be configured to stream data between the host device and the target device for granting the initial input/output request. Because the system 200 of the present invention allows the intermediate device 204 to receive the aforementioned signals, the intermediate device 204 may control the data transfer phase, and thus, may stream the data between the host 202 and the target device (206 and/or 208). By streaming the data between the host device and the target devices, the system 200 of the present invention may better utilize the full bandwidth potential of the connection medium(s), thereby resulting in improved system performance. Further, the connection medium between the intermediate device 204 and the targets 206, 208 (i.e., secondary connection medium) may be different than the connection medium between the intermediate device 204 and the host 202 (i.e., primary connection medium). By streaming data from the secondary connection medium to the primary connection medium, the system 200 may utilize these mediums within an acceptable cost. Also, in the present invention, data transfer may occur in a non-overlapping manner. For instance, because the intermediate device 204 controls data transfer, the intermediate device may first transfer data from the first target device 206 to the host 202 and then, once this data transfer is complete, the intermediate device may transfer data from the second target device 208 to the host 202. In conventional systems, as shown in FIG. 1, because data transfer is controlled by the target devices, data may be simultaneously transferred from different target devices to the intermediate device, thereby contributing to the buffering inefficiencies often associated with current systems.

In alternative embodiments, the system 200 of the present invention may be utilized for streaming data between the host device 202 and the target devices 206, 208, for granting an initial input/output request that is a write request. In such embodiments, the aforementioned signals may indicate to the intermediate device 204 that the target devices (206, 208) are ready for data transfer from the host to the target devices.

In the exemplary embodiment, illustrated in FIG. 2, the initial input/output request and the generated input/output requests implement SCSI (Small Computer System Interface) protocol. In further embodiments, the system 200 of the present invention may be configured to support DMA (Direct Memory Access), such as Remote DMA (RDMA).

Figure 3:
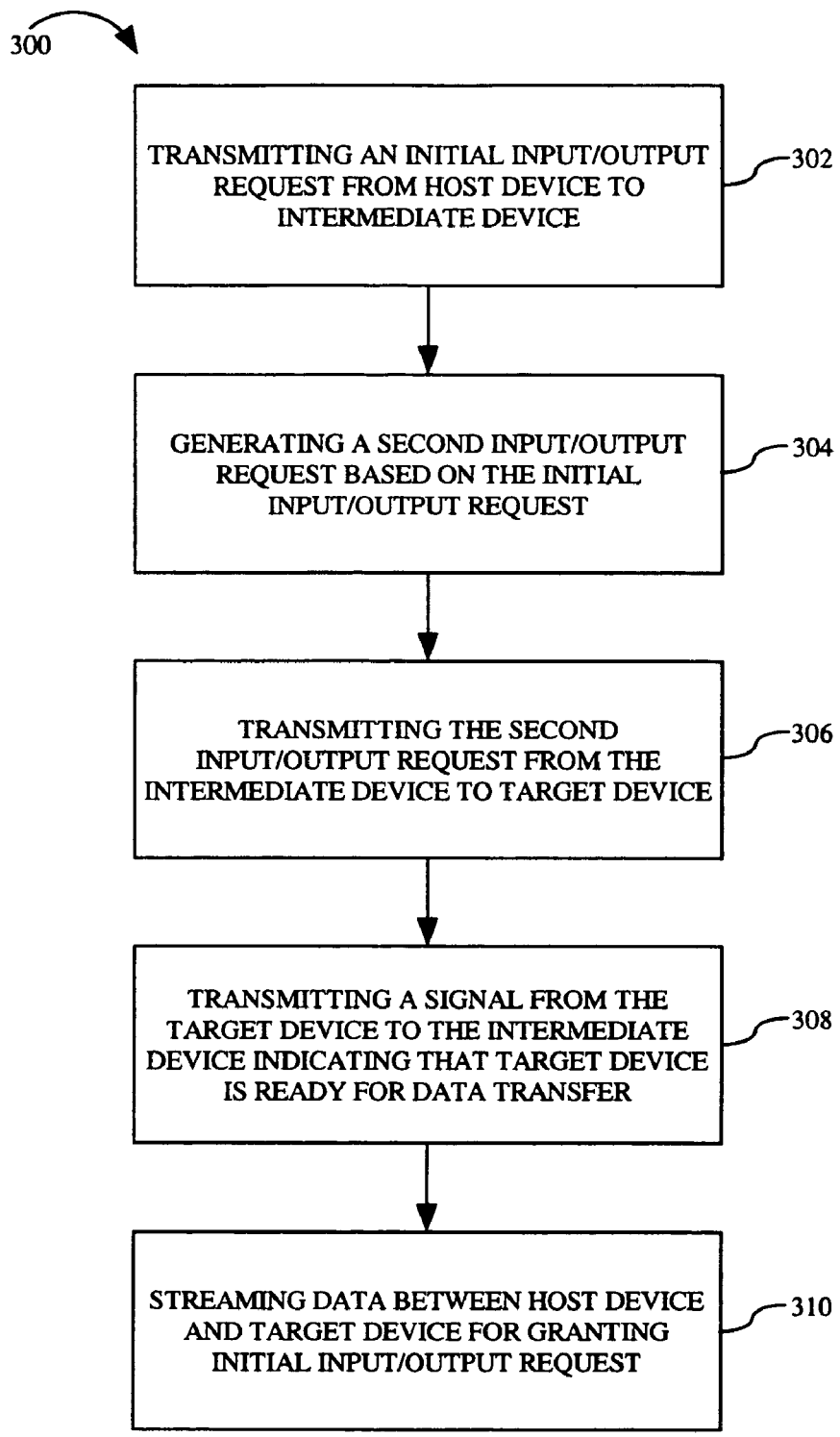
FIG. 3 is a flow chart illustrating a method for transmitting data between a host device and a target device, wherein the host device and the target device are communicatively coupled through an intermediate device via a connection medium, in accordance with an exemplary embodiment of the present invention.

FIG. 3 is a flowchart illustrating a method for transmitting data between a host device and a target device, wherein the host device and the target device are communicatively coupled through an intermediate device via a connection medium, in accordance with an embodiment of the present invention. The method 300 includes the step of transmitting an initial input/output request from the host device to the intermediate device 302. The method 300 further includes the step of generating a second input/output request based on the initial input/output request 304. The method further includes the step of transmitting the second input/output request from the intermediate device to the target device 306. The method further includes the step of transmitting a signal from the target device to the intermediate device indicating that the target device is ready for data transfer 308. The method further includes streaming data between the host device and the target device for granting the initial input/output request 310.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for transmitting data between a host device and a plurality of target devices during data transfer phases of inputs/outputs (I/Os), wherein the host device and the plurality of target devices are communicatively coupled through an intermediate device via a connection medium, the method comprising:
   receiving an initial read request at the intermediate device, said initial read request having been transmitted from the host device to the intermediate device, said initial read request including a request for read data;
   generating a second read request and a third read request via the intermediate device, said second read request and third read request being based on the initial read request;
   transmitting the second read request from the intermediate device to a first target device included in the plurality of target devices;
   transmitting the third read request from the intermediate device to a second target device included in the plurality of target devices;
   receiving a first signal at the intermediate device, said first signal having been transmitted from the first target device to the intermediate device;
   receiving a second signal at the intermediate device, said second signal having been transmitted from the second target device to the intermediate device;
   after receiving the first signal, establishing a first data transfer connection via the intermediate device between the host device and the intermediate device;
   after receiving the second signal, establishing a second data transfer connection via the intermediate device between the host device and the intermediate device;
   after establishing the first data transfer connection between the intermediate device and the host device, streaming a first portion of the requested read data from the first target device to the host device via the intermediate device and via the first data transfer connection for granting the initial read request, said first portion of the requested read data including data requested in the initial read request; and
   after establishing the second data transfer connection and after streaming of said first portion of the requested read data from the first target device to the host device via the intermediate device is complete, streaming a second portion of the requested read data from the second target device to the host device via the intermediate device and via the second data transfer connection for granting the initial read request, said second portion of the requested read data including data requested in the initial read request.

2. A method as claimed in claim 1, wherein the initial read request and the second request implement SCSI (Small Computer System Interface) protocol.

3. A method as claimed in claim 1, wherein the connection medium supports DMA (Direct Memory Access).

4. A non-transitory computer-readable medium having computer-executable instructions for performing a method for transmitting data between a host device and a plurality of target devices during data transfer phases of inputs/outputs (I/Os), wherein the host device and the plurality of target devices are communicatively coupled through an intermediate device via a connection medium, said method comprising:
   transmitting an initial read request from the host device to the intermediate device, said initial read request including a request for read data;
   generating a second read request and a third read request via the intermediate device, said second read request and third read request being based on the initial read request;
   transmitting the second read request from the intermediate device to a first target device included in the plurality of target devices;
   transmitting the third read request from the intermediate device to a second target device included in the plurality of target devices;
   receiving a first signal at the intermediate device, said first signal having been transmitted from the first target device to the intermediate device;
   receiving a second signal at the intermediate device, said second signal having been transmitted from the second target device to the intermediate device;
   after receiving the first signal, establishing a first data transfer connection via the intermediate device between the host device and the intermediate device;
   after receiving the second signal, establishing a second data transfer connection via the intermediate device between the host device and the intermediate device;
   after establishing the first data transfer connection between the intermediate device and the host device, streaming a first portion of the requested read data from the first target device to the host device via the intermediate device and via the first data transfer connection for granting the initial read request, said first portion of the requested read data including data requested in the initial read request; and after streaming of the first portion of the requested read data from the first target device to the host device via the intermediate device is completed, streaming a second portion of the requested read data from the second target device to the host device via the intermediate device and via the second data transfer connection for granting the initial read request, said second portion of the requested read data including data requested in the initial read request.

5. A non-transitory computer-readable medium as claimed in claim 4, wherein the initial read request and the second read request implement SCSI (Small Computer System Interface) protocol.

6. A non-transitory computer-readable medium as claimed in claim 4, wherein the connection medium supports DMA (Direct Memory Access).

7. A system for implementing a storage protocol with initiator controlled data transfer, comprising:
 a host device;
 a first target device;
 a second target device; and
 an intermediate device for communicatively coupling the host device, the first target device and the second target device, the intermediate device being configured to receive an initial read request from the host device, the initial read request including a request for read data, the intermediate device being configured to generate a second read request and a third read request based on the initial read request, the intermediate device being further configured to transmit the second read request to the first target device and to transmit the third read request to the second target device, wherein the intermediate device: receives a first signal from the first target device and a second signal from the second target device; after receiving the first signal, establishes a first data transfer connection with the host device; after receiving the second signal, establishes a second data transfer connection with the host device, after establishing the first data transfer connection, streams a first portion of the requested read data to the host device via the first data transfer connection for granting the initial read request, said first portion of the requested read data including data requested in the initial read request; and after streaming of the first portion of the requested data to the host device is completed, streams said second portion of the requested read data to the host device via the second data transfer connection for granting the initial read request, said second portion of the requested read data including data requested in the initial read request.

8. A system as claimed in claim 7, wherein the initial read request and the second read request implement SCSI (Small Computer System Interface) protocol.

9. A system as claimed in claim 8, wherein the system supports DMA (Direct Memory Access).

* * * * *